No. 861,606. PATENTED JULY 30, 1907.
J. A. PAUTASSO.
BOOK CAMERA.
APPLICATION FILED JAN. 3, 1905.
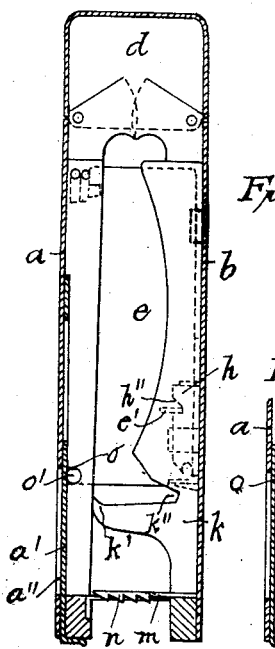
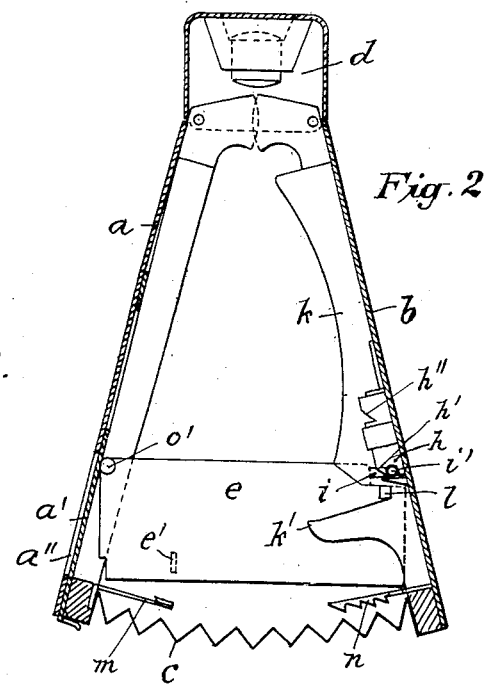
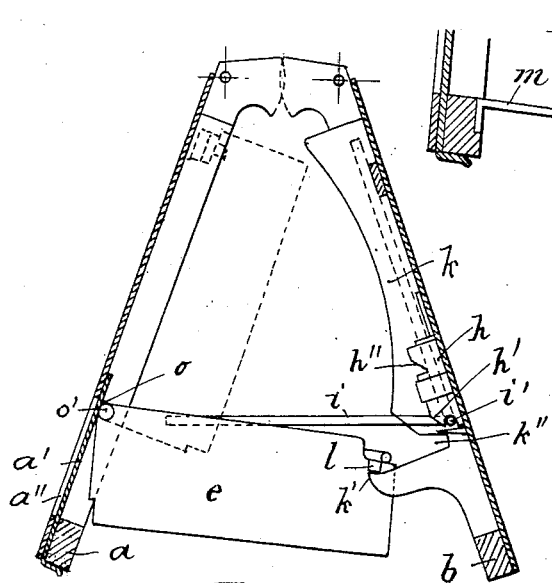
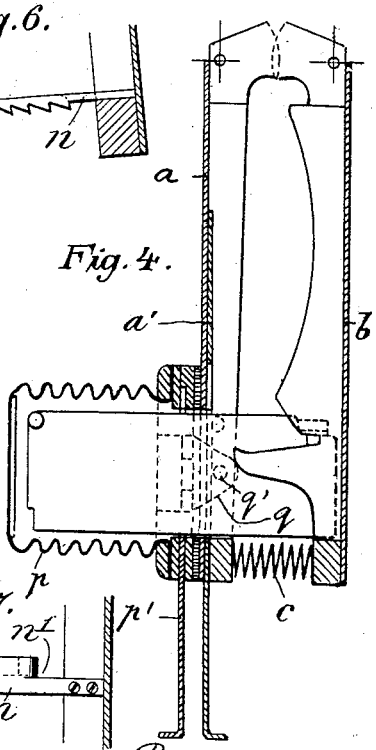
Witnesses:—
M. V. Doyle.
Russell M. Everett.
Jean Antoine Pautasso, Inventor,
by Charles H. Pell, Attorney.

UNITED STATES PATENT OFFICE.

JEAN ANTOINE PAUTASSO, OF GENEVA, SWITZERLAND.

BOOK-CAMERA.

No. 861,606.  Specification of Letters Patent.  Patented July 30, 1907.

Application filed January 3, 1905. Serial No. 239,457.

*To all whom it may concern:*

Be it known that I, JEAN ANTOINE PAUTASSO, a subject to the King of Italy, residing at Geneva, in the canton of Geneva, Switzerland, have invented certain new and useful Improvements in Book-Cameras; and I do hereby declare the following to be a full, clear, and exact description of the invention, such as will enable others skilled in the art to which it appertains to make and use the same, reference being had to the accompanying drawings, and to letters of reference marked thereon, which form a part of this specification.

The objects of this invention are to provide a book camera made up of two hinged parts, which, when folded occupies but a small space; to construct a camera of this kind provided with a plate magazine hinged to one part on one end, and arranged to drop to its normal position by gravity; to provide means for locking the plate magazine in place by a partial closing of the camera; and to provide means for conveying an exposed plate to the bottom of the plates in the plate magazine, when the camera is closed.

An object is to provide a camera, of this kind, that cannot be opened after being partly folded until after it has been entirely closed.

The invention is illustrated in the accompanying drawings, in which

Figure 1 is a sectional view of the camera when closed. Fig. 2 is a similar view showing the camera open with its parts in position to photograph. Fig. 3 represents the camera after opened out in position, showing the top plate slightly withdrawn, and Fig. 4 is a section with a camera closed with a pocket attached to allow the removal of the plate magazine in daylight. Fig. 5 is a detail showing the disposition, in the camera frame, of the bearings which allow the removal of the magazine. Figs. 6 and 7 are details of the catch mechanism which provides against an opening of the frame after it has been partially closed.

The camera comprises the two hinged portions $a$ and $b$ which are connected on their outer ends by the bellows $c$, and hinged upon a head plate or small box $d$, containing in the usual manner the lens and shutters. Upon the member $a$ is pivoted the magazine $e$ in suitable bearings in the frame work, and the magazine is removable and is provided with a series of plates or plate-holders having pins upon one end by which they are adapted to be withdrawn, as hereinafter described. Instead of operating the plate magazine $e$, as heretofore, by means of levers, it is dropped into focal plane of the lens by opening up the members $a$ and $b$, and the plate magazine falls in the position shown in Fig. 3, but with the top-most plate inside the magazine. The two members $a$ and $b$ are then slightly drawn together, and the fingers $l$ ride up on the face $k'$ of the book $k$ into the recess $k^{11}$ in which they are tightly wedged. At the same time the pins $i^1$ of the plate-holder $i$ raises the spring catch $h$ by engaging the chamfered latch $h^1$ and becomes locked under the latch. This position is shown in Fig. 2. After a picture is taken on the top-most plate, the members are again swung apart, as in Fig. 3, and the top-most plate is pulled away from the other plates. The plate magazine $e$ is now manually swung on its pivot, and it also serves to swing the plate-holder $i$ around to the dotted position shown in Fig. 3. When the parts $a$ and $b$ are now swung together, the lips $c^1$ of the plate-magazine $e$ engage the chamfered portion $h^{11}$ and the latch $h$ is raised so that the pins $i^1$ of the plate-holder are released and the plate is then forced into the bottom of the series of plates in the magazine and held against withdrawal by a suitable means. The swinging of the magazine is effected by means of the pins $o^1$ fitting in the recesses $o$ in the side plates of the part $a$, these recesses being open on one side when the door $a^1$ is opened so that the plate magazine can be withdrawn through the opening $a^{11}$.

I provide a sectional hook, illustrated more particularly in Figs. 6 and 7, so that when a picture has been taken and the frame partly closed, as soon as the hook portion $m^1$ of the spring arm $m$ engages the teeth of the arm $n$, it cannot be withdrawn until the camera has been entirely closed, when the tooth $m^1$ steps up into the opening $n^1$ of the spring $n$, and the members can be again pulled apart.

When the camera is operated, all that is necessary is to open the members $a$ and $b$ and allow the plate magazine to swing, by gravity, down into place on the plates $k$, and then the portions can be slightly forced together, and the camera is ready for picture taking.
When the picture is taken, the plate magazine is swung in, the members $a$ and $b$ snapped together, and the camera is again ready for operation.

When it is desired to remove a plate magazine in daylight, the slide $a^1$ is withdrawn, and a pocket $p$ is attached to the member $a$, as in Fig. 4, which has a sliding cover $p^1$ which is also withdrawn, the pocket being held by the hinged pieces $q$ which can be forced over the pins $q^1$ on the outside of the camera member $a$. The magazine can be removed into the pocket, the door $p^1$ closed, and when a fresh magazine is to be inserted the operation is reversed.

Having thus described my invention, what I claim is:—

1. A camera comprising hinged members, a plate magazine hinged to one of the members, and a hook on the opposite member, the plate-magazine being adapted to swing onto the hook when the camera members are parted.

2. A camera comprising hinged members, a plate-magazine pivoted to one member, a hook on the other member having means for holding the edge of the magazine, the plate-magazine being adapted to drop on the hook by gravity, and be forced to focal position by a partial closing of the camera members.

3. A camera comprising hinged members, a plate magazine hinged to one of the members, the plate magazine being open at the top and bottom, a series of plate holders means for holding the plate-holders in the magazine, a hook on the other member for engaging the end of the plate magazine, the magazine being adapted to drop on the hook by gravity, means for engaging the free end of the magazine when the members are partially closed, and means on the second member for engaging the top most plate-holder.

4. A camera comprising hinged members, a plate magazine hinged to one of the members, the plate-magazine being adapted to drop between the members by gravity when the members are open, means for securing the magazine in focal position when the members are partially closed, a series of plate-holders in the magazine having pins on one end, the pins of the top most member projecting from the magazine, means for engaging the pins on the top most plate-holder when the magazine is in focal position, whereby when the magazine is swung inward the plate turns on its pins as a pivot, and means for feeding the holder in the bottom of the magazine and releasing its holding means when the camera members are closed.

5. An improved camera comprising hinged members having a plate-magazine hinged to one of the members, of a spring hook on one member, and a rack on the other member having teeth for the engagement of the hook, the rack having a recess to release the hook when the pivoted members are entirely closed.

In testimony, that I claim the foregoing, I have hereunto set my hand this 13th day of December 1904.

JEAN ANTOINE PAUTASSO.

Witnesses:
R. SOLLBERGER,
M. WOIBLET.